United States Patent
Chen et al.

(10) Patent No.: US 7,508,473 B2
(45) Date of Patent: Mar. 24, 2009

(54) DEVICE OF LIQUID CRYSTAL FOR INCREASING APERTURE RATIO AND VIEWING ANGLE THEREOF

(75) Inventors: Chih-Wen Chen, Tainan (TW); Wan-Hua Lu, Hsin-Chu (TW); Hon-Long Hou, Chang-Hua (TW); Ming-Chou Wu, Nantao (TW)

(73) Assignee: AU Optronics Corporation, Hsinchu (TW)

( * ) Notice: Subject to any disclaimer, the term of this patent is extended or adjusted under 35 U.S.C. 154(b) by 269 days.

(21) Appl. No.: 11/163,807

(22) Filed: Oct. 31, 2005

(65) Prior Publication Data

US 2007/0030426 A1 Feb. 8, 2007

(30) Foreign Application Priority Data

Aug. 8, 2005 (TW) ............................... 94126716 A

(51) Int. Cl.
*G02F 1/1335* (2006.01)

(52) U.S. Cl. ........................ 349/117; 349/119; 349/121

(58) Field of Classification Search .......... 349/117–121
See application file for complete search history.

(56) References Cited

U.S. PATENT DOCUMENTS

| | | | | |
|---|---|---|---|---|
| 5,291,323 A * | 3/1994 | Ohnishi et al. | ............... | 349/120 |
| 5,344,916 A * | 9/1994 | Harris et al. | ................. | 528/353 |
| 5,410,422 A * | 4/1995 | Bos | ............................. | 349/117 |
| 5,493,431 A * | 2/1996 | Baba et al. | ................... | 349/117 |
| 6,081,312 A * | 6/2000 | Aminaka et al. | ............ | 349/118 |
| 6,084,647 A * | 7/2000 | Hatano et al. | ................. | 349/15 |
| 6,295,109 B1 * | 9/2001 | Kubo et al. | .................. | 349/119 |
| 6,567,142 B1 * | 5/2003 | Kim | ............................ | 349/119 |
| 6,650,385 B1 * | 11/2003 | Liu | ............................ | 349/113 |
| 6,900,863 B2 * | 5/2005 | Okamoto et al. | ............ | 349/114 |
| 7,084,944 B2 * | 8/2006 | Ito et al. | ...................... | 349/117 |
| 2002/0140888 A1 * | 10/2002 | Nishiyama et al. | .......... | 349/117 |
| 2004/0085496 A1 * | 5/2004 | Paukshto et al. | ............ | 349/106 |
| 2004/0085500 A1 * | 5/2004 | Sa et al. | ...................... | 349/117 |
| 2006/0092357 A1 * | 5/2006 | Ishitani | ....................... | 349/117 |

FOREIGN PATENT DOCUMENTS

JP 2004-309612 4/2004
JP 2006154784 A * 6/2006

* cited by examiner

*Primary Examiner*—Mike Qi
(74) *Attorney, Agent, or Firm*—Squire, Sanders & Dempsey, L.L.P.

(57) ABSTRACT

A device of liquid crystal display of liquid crystal display for increasing aperture ratio and viewing angle thereof is disclosed. The device comprises a thin film transistor array substrate having a first polarizer on a bottom side, a phase retardation dielectric film having a low dielectric constant on the thin film transistor array substrate and a transparent electrode film on the phase retardation dielectric film, the phase retardation dielectric film compensates phase retardation of light resulting from light with a tilt incident angle passing through liquid crystal between the thin film transistor array substrate and a liquid crystal substrate.

5 Claims, 2 Drawing Sheets

DEVICE OF LIQUID CRYSTAL FOR INCREASING APERTURE RATIO AND VIEWING ANGLE THEREOF

FIELD OF THE INVENTION

The present invention relates to a device of liquid crystal display, and more particularly to a device of liquid crystal display with a high aperture ratio and a wide viewing angle.

DESCRIPTION OF THE RELATED ART

Liquid crystal display (LCD) technology is one of most advanced and popular display technologies nowadays for computer monitors, communication products and consumer appliances. Contrary to the conventional display technology such as those that use cathode ray tubes, the liquid crystal display technology utilizes a flat and a completely different image display principle which provide a flat-plate shape and much lighter weight.

Although the liquid crystal display technology has the above-mentioned advantages, there are still several issues need to be researched and solved. For example, one of the important characteristics of one liquid crystal display is the aperture ratio which refers to the ratio of the transparent area of the pixel relative to the size of the entire pixel. Another one of the important characteristics of one liquid crystal display is the viewing angle of liquid crystal display which is limited by phase retardation of light passing through Liquid crystal. It is toward these goals that the present invention is specifically directed.

SUMMARY OF THE INVENTION

It is therefore an object of the invention to provide a device of liquid crystal display for increasing the aperture ratio and the viewing angle thereof.

It is another object of this invention to provide a device of liquid crystal display with less image sticking problem.

It is still another object of this invention to provide a device of liquid crystal display with an increased area of electrode without the cross talk issue.

It is a further object of this invention to provide a device of liquid crystal display with a low-cost optical compensator.

To achieve these objects, and in accordance with the purpose of the invention, the invention discloses a device of liquid crystal display of liquid crystal display for increasing aperture ratio and viewing angle thereof. The device comprises a thin film transistor array substrate having a first polarizer on a bottom side, a phase retardation dielectric film having a low dielectric constant on the thin film transistor array substrate and a transparent electrode film on the phase retardation dielectric film, the phase retardation dielectric film compensates phase retardation of light resulting from light with a tilt incident angle passing through liquid crystal between the thin film transistor array substrate and a liquid crystal substrate.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the process steps and structures described below do not cover a complete process flow and structure. The present invention can be practiced in conjunction with various fabrication techniques that are used in the art, and only so much of the commonly practiced process steps are included herein as are necessary to provide an understanding of the present invention.

The present invention will be described in detail with reference to the accompanying drawings. It should be noted that the drawings are in greatly simplified form and they are not drawn to scale. Moreover, dimensions have been exaggerated in order to provide a clear illustration and understanding of the present invention.

Figure 1A:
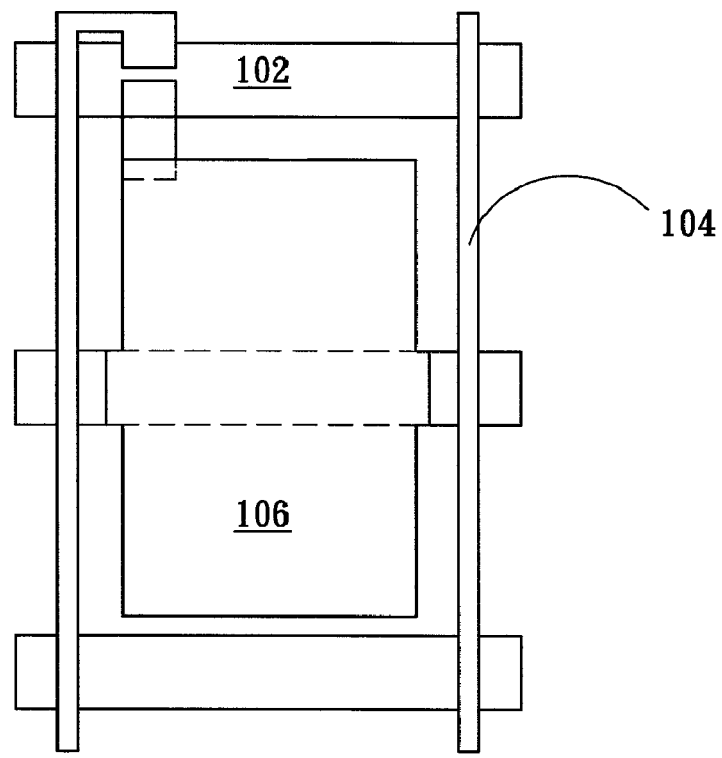
FIG. 1A shows a top view of a portion of pixel layout including gate line, data line and transparent electrode.
Figure 1B:
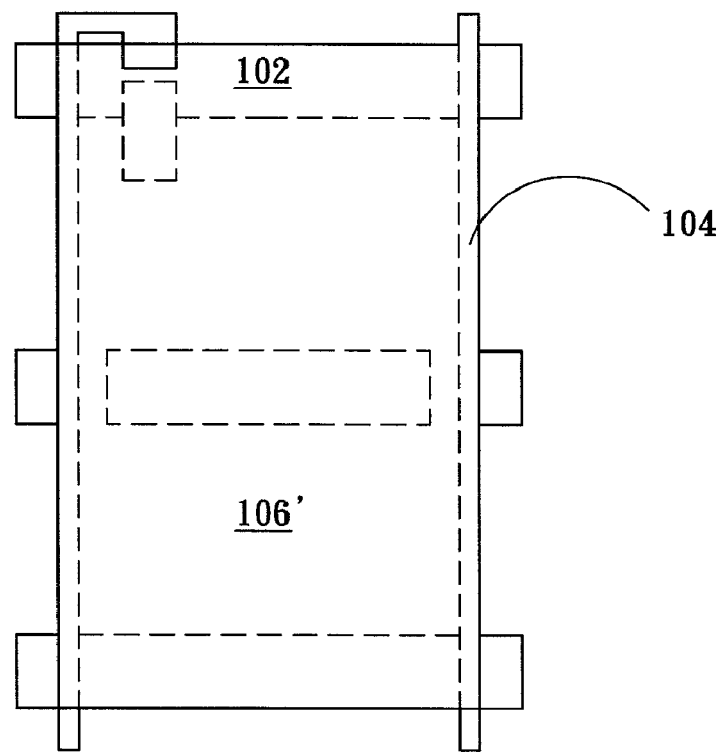
FIG. 1B shows another top view of a portion of pixel layout including gate line, data line and transparent electrode.

Referring to FIG. 1A, a top view of a portion of pixel layout including gate line 102, data line 104 and transparent electrode 106 are shown. In case of cross talk issue between gate line 102, data line 104 and transparent electrode 106, transparent electrode 106 can only be formed adjacent gate line 102, data line 104 as close as possible which means that the aperture ratio is limited. FIG. 1B shows another top view of a portion of pixel layout including gate line 102, data line 104 and transparent electrode 106'. An organic dielectric film (not shown) with a low dielectric constant is formed over gate line 102 and data line 104 before transparent electrode 106' is formed thereon so that transparent electrode 106' can be formed extremely close to even overlap gate line 102 and data line 104 to increase the aperture ratio without severe cross talk issue.

Figure 2:
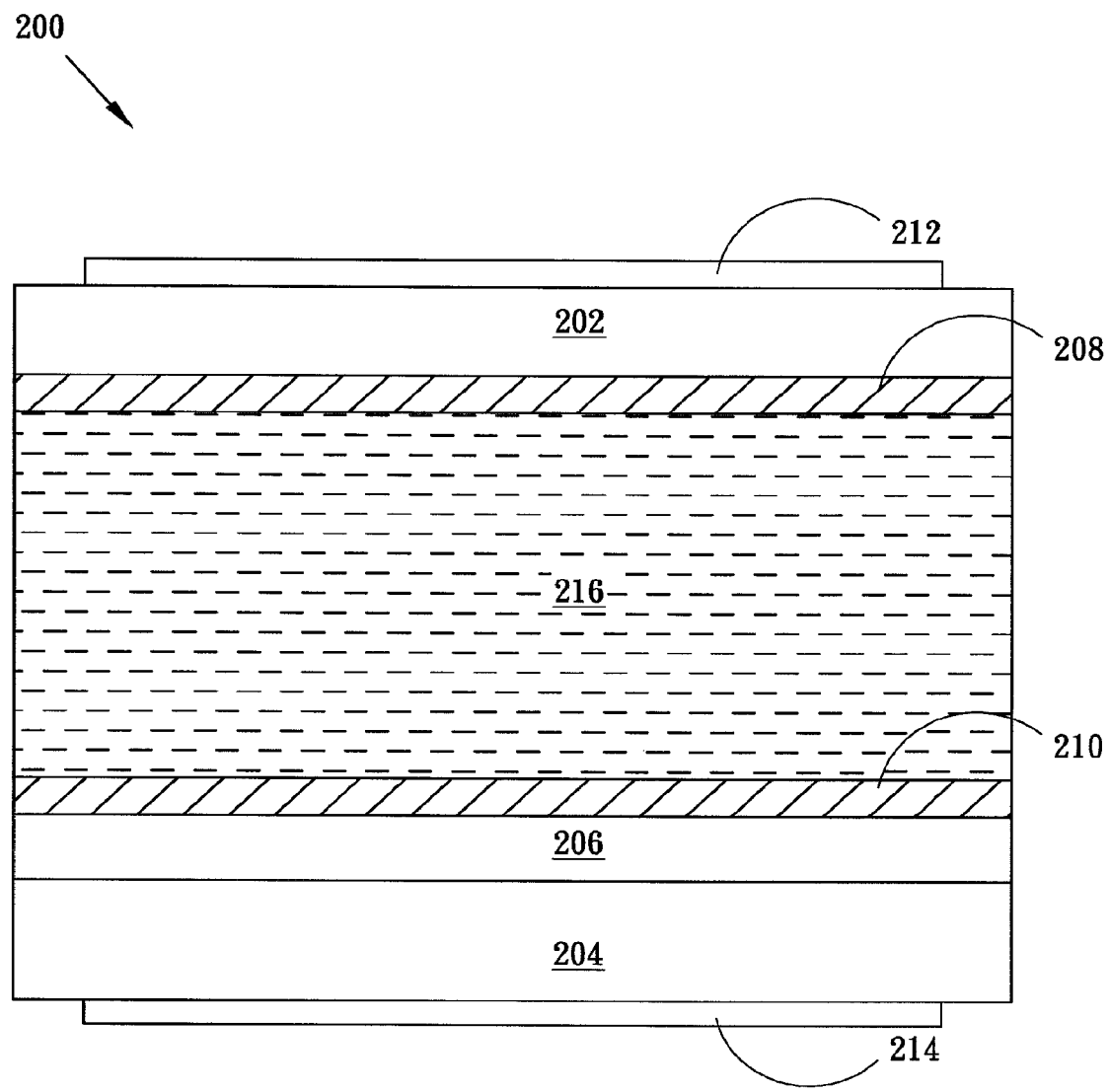
FIG. 2 shows a cross sectional view of a device of liquid crystal display of the invention.

FIG. 2 shows a cross sectional view of a device of liquid crystal display 200 of the invention. The device of liquid crystal display 200 comprises substrates 202 and 204, a phase retardation organic dielectric film 206 having a low dielectric constant, transparent electrodes 208 and 210, polarizers 212 and 214. The substrate 202 comprises a liquid crystal substrate further including a color filter. The phase retardation organic dielectric film 206 preferably has a thickness in a range about 0.1 micron to 10 microns. The material of the phase retardation organic dielectric film 206 is preferably selected from polyimide, polyamide, polyester, polyacetal, polycarbonate, polyamideimide and polyesterimide. The following formulas belong to polyimide and polyamide compounds of two examples of the phase retardation organic dielectric film of the invention respectively, $\epsilon$ is dielectric constant.

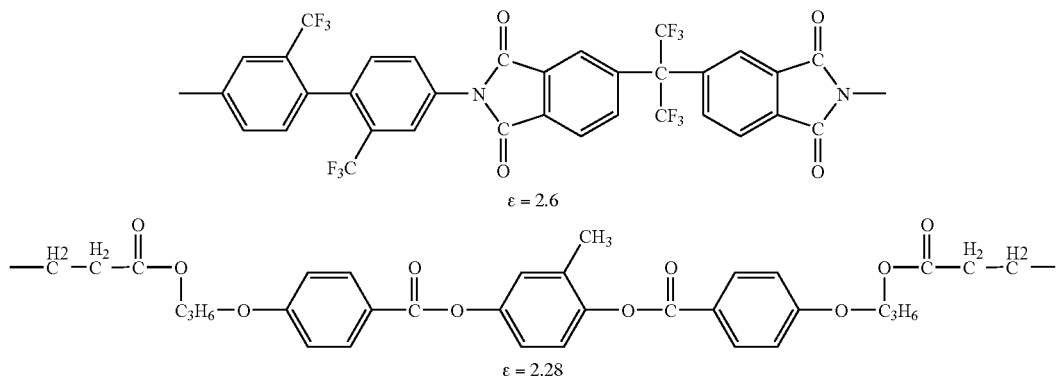

It is also known that Liquid crystal is material of dual indexes of refraction. Light splits into ordinary ray and extraordinary ray after passing through Liquid crystal molecules. Light would split into two refractive rays if light travels with a tilt angle into Liquid crystal molecules. Therefore, phase retardation would present after light passes through Liquid crystal molecules. Thus compensation films are utilized to compensate the phase retardation resulting from the travel of light through Liquid crystal molecules so as to increase the viewing angle of liquid crystal display.

In one embodiment of this invention, the device of liquid crystal display utilizes a phase retardation organic dielectric film having a low dielectric constant formed on gate lines and data lines of a thin-film transistor substrate before transparent electrodes is formed so as to render the transparent electrodes as close as possible to even overlap the gate lines and data lines to increase the aperture ratio without severe cross talk issue. Moreover, the phase retardation organic dielectric film also has phase retardation/compensation function so as to increase the viewing angle of liquid crystal display. In FIG. 1B, the phase retardation organic dielectric film is formed on gate line 102 and data line 104 and under transparent electrode 106' to increase the aperture ratio of liquid crystal display.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A device of liquid crystal display, said device of liquid crystal display comprising:

a thin film transistor array substrate having a first polarizer on a bottom side, wherein the thin film transistor array substrate comprises a bare substrate and at least one pixel which is disposed on the bare substrate;

a phase retardation dielectric film on the pixel of said thin film transistor array substrate, said phase retardation dielectric film has a low dielectric constant; and a transparent electrode film on said phase retardation dielectric film, wherein the phase retardation dielectric film is disposed between the thin film transistor array substrate and the transparent electrode film, the phase retardation dielectric film touches the bare substrate and the transparent electrode film.

2. The device of liquid crystal display according to claim 1, wherein said phase retardation dielectric film has a thickness in a range about 0.1 micron to 10 microns.

3. The device of liquid crystal display according to claim 1, wherein said phase retardation dielectric film compensate phase retardation of light resulting from light with a tilt incident angle passing through liquid crystal between said thin film transistor array substrate and a liquid crystal substrate to increase the viewing angle of the liquid crystal display.

4. The device of liquid crystal display according to claim 1, wherein said transparent electrode film and said phase retardation dielectric film overlap said gate lines and said data lines of said thin film transistor array substrate.

5. The device of liquid crystal display according to claim 1, wherein the material of said phase retardation dielectric film is selected from polyimide, polyamide, polyester, polyacetal, polycarbonate, polyamideimide, polyesterimide.

* * * * *